United States Patent [19]
Heartz

[11] 3,883,861
[45] May 13, 1975

[54] DIGITAL DATA BASE GENERATOR

[75] Inventor: Robert A. Heartz, Deland, Fla.

[73] Assignee: General Electric Company, New York, N.Y.

[22] Filed: Nov. 12, 1973

[21] Appl. No.: 415,253

[52] U.S. Cl. ..... 340/324 R; 340/27 NA; 340/324 A; 343/5 MM; 353/11
[51] Int. Cl. ............................................. G08b 5/36
[58] Field of Search ...... 353/5; 340/324 A, 324 AD, 340/324 R, 172.5, 24, 27 NA; 343/5 MM; 353/5, 11, 12

[56] References Cited
UNITED STATES PATENTS

| | | | |
|---|---|---|---|
| 2,508,562 | 5/1950 | Bonner | 343/5 MM |
| 2,847,661 | 8/1958 | Althouse | 340/324 A |
| 3,054,998 | 9/1962 | Cooper et al. | 343/5 MM |
| 3,474,438 | 10/1969 | Lanher | 340/324 A |

Primary Examiner—David L. Trafton
Attorney, Agent, or Firm—Allen E. Amgott; Raymond H. Quist

[57] ABSTRACT

Apparatus for encoding in a digital form information to produce a data base descriptive of a land mass or the like. The information being encoded is simultaneously displayed, and compared with the source of the information which may be a map, photograph, etc.

4 Claims, 10 Drawing Figures

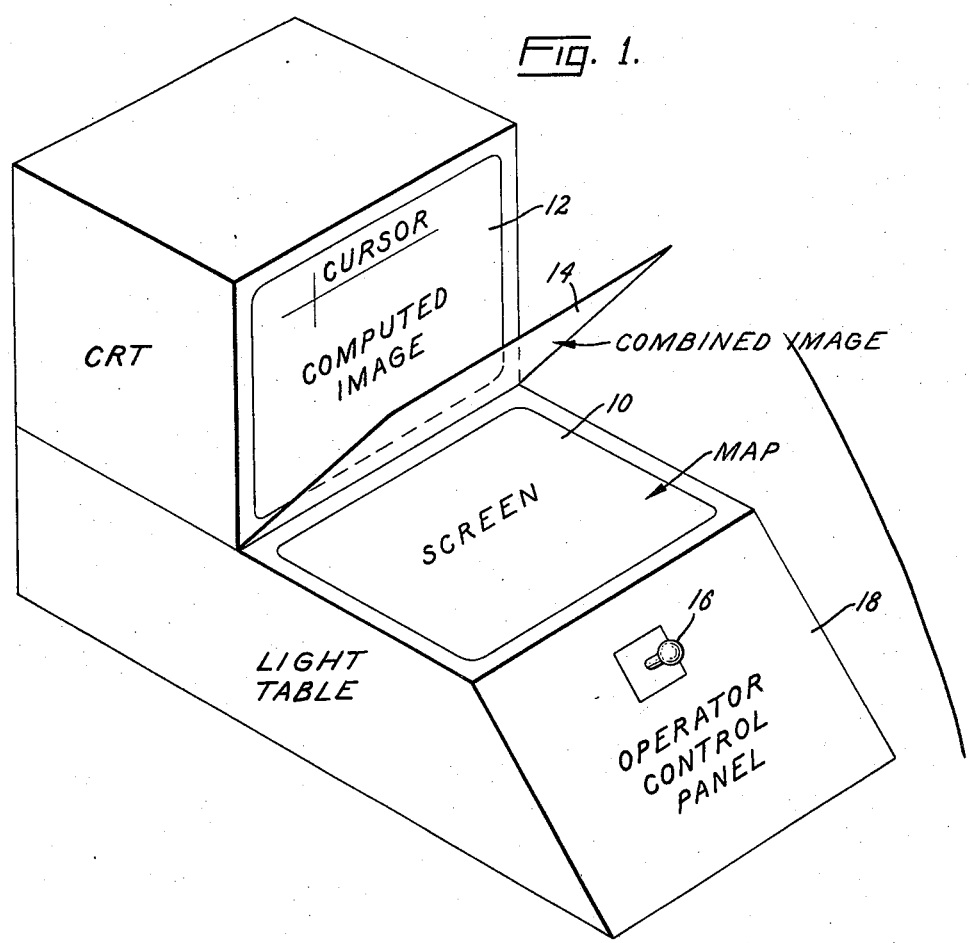
Fig. 1.
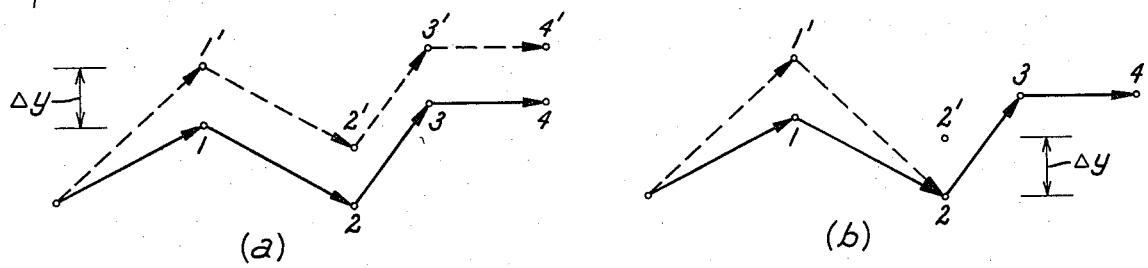
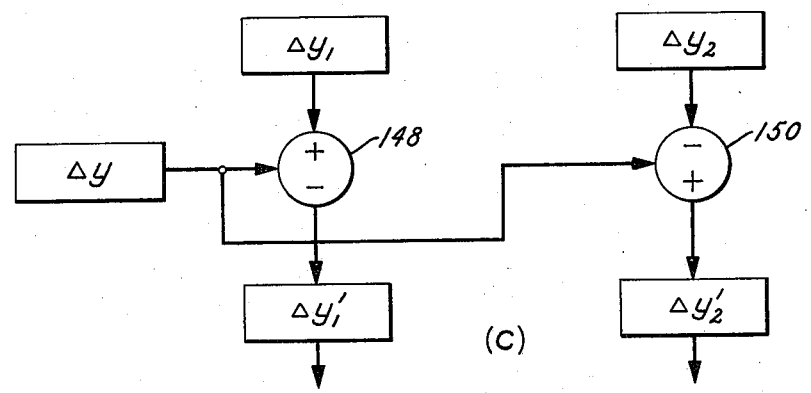
Fig. 8.

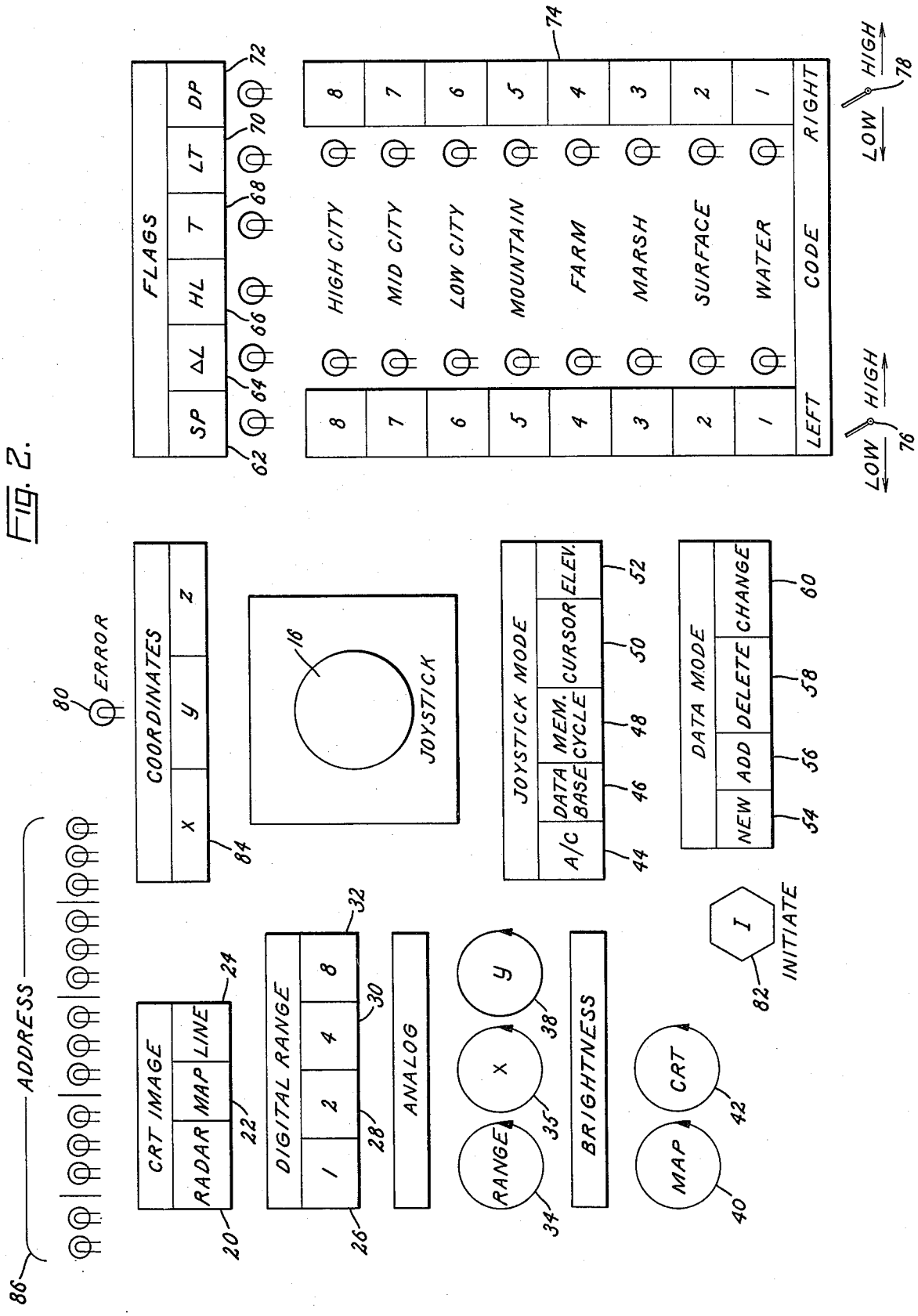

DIGITAL DATA BASE GENERATOR

BACKGROUND OF THE INVENTION

This invention relates generally to digital land mass simulators and more particularly to devices for producing and changing digital data bases for land mass simulators and other applications.

Currently digital radar land mass simulators employ a data base in which terrain and cultural features are stored in the form of the coordinates of the end points of lines defining the features. In addition, other information such as radar reflectivity is also stored. The data base may be in any of the digital formats commonly used with automatic data processing equipment.

The information from which such a digital base is produced is often in graphical form (maps, photographs, etc.) so that a completely automatic conversion is not economically feasible if at all possible. There is a need, however, to facilitate digital data base preparation as well as providing for its correction and updating.

SUMMARY OF THE INVENTION

In a preferred form of the invention, a display such as a cathode ray tube is used to depict the information in a selected portion of the data base memory. The image of a map or other graphic source of information is shown on a 45° beam splitter together with the image of the CRT. A cursor is used to locate on the CRT a point about which information is to be put into the data base memory. The point may be, for example, one end of a ridge or valley line. The information may include the location of the point in x, y, and z coordinates, the nature of the point (beginning of a series of lines, an increment from a previous point, a point target, etc.), or any other desired information for the particular data base. When the information is entered, it is added to the CRT display. Similarly, points may be deleted or changed.

BRIEF DESCRIPTION OF THE DRAWINGS

FIG. 1 shows in isometric the overall arrangement of the apparatus;

FIG. 2 shows the control panel of the apparatus of FIG. 1;

FIG. 8 shows diagramatically and by block diagram the data change mechanism;

DESCRIPTION OF THE PREFERRED EMBODIMENTS

Figure 3:
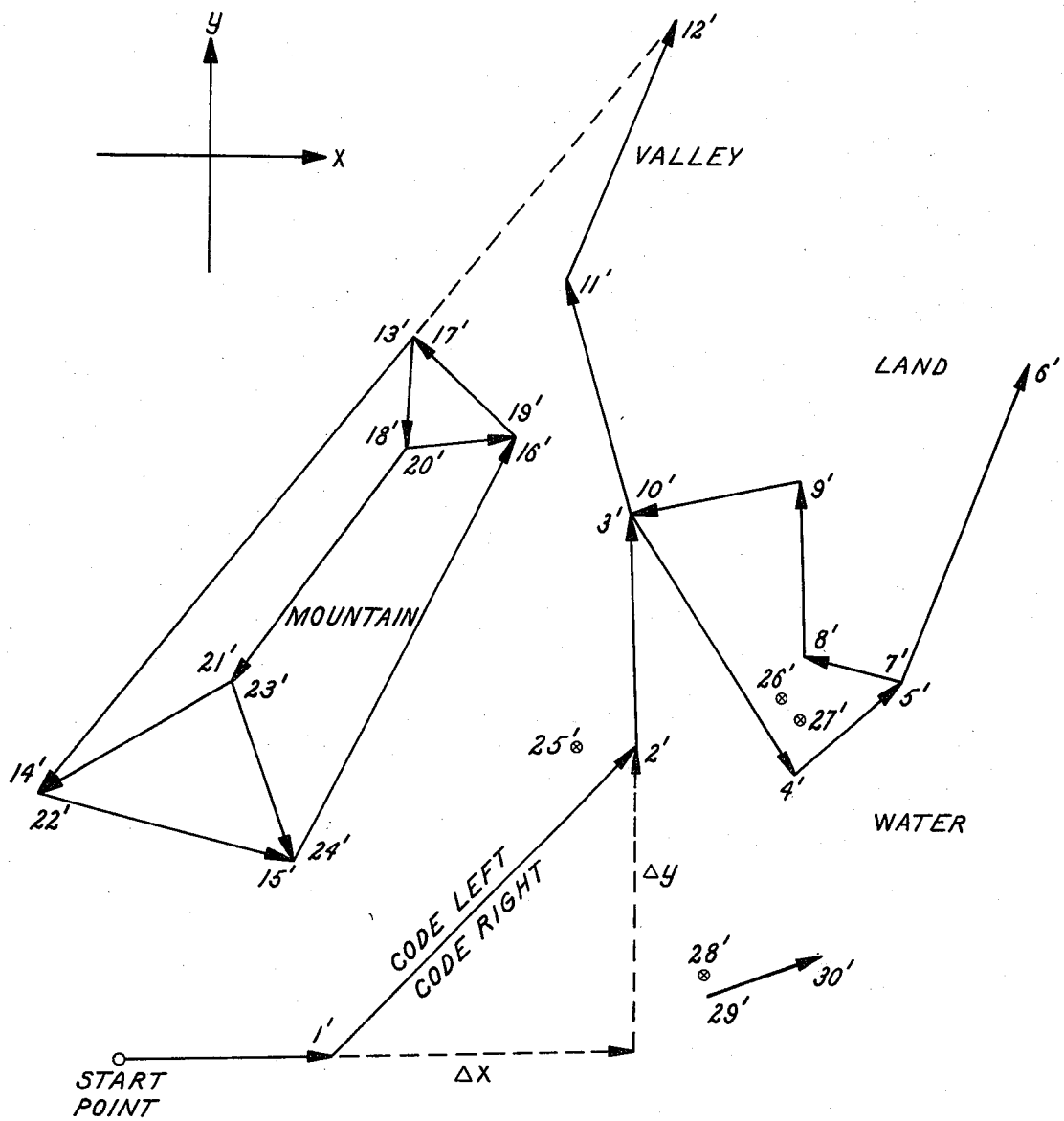
FIG. 3 shows typical information which might be included in the data base.

The overall approach of this invention can be conveniently apprehended by referring to FIG. 1. A map or photograph of the terrain to be encoded is placed on screen 10 of a light table. As the data base is prepared, its representation appears on the face 12 of a cathode ray tube. The combined CRT and map or photograph images appear on 45 degree beam splitter 14. A cursor, the position of which is controlled by joystick 16, also appears on the face of the CRT. Various controls on control panel 18 are provided to introduce into the data base, information which is related to the terrain identified by the cursor.

It should be understood that although the following description relates particularly to a data base for a digital radar land mass simulator it is only by way of example. Thus if one were only interested in updating or making digital maps much of the apparatus described would be superfluous.

FIG. 2 illustrates controls to be found on a typical control panel. Selection of the type of image it is desired to display on the CRT is performed by closing one of the switches 20 to 24. Radar switch 20 causes generation of a realistic slant range plan position indicator (PPI) type display with all radar effects. Map switch 22 causes generation of a ground range display with elimination of special radar effects which tend to obscure the image such as beam width integration, antenna pattern, etc. The ground range display correlates directly with map or aerial photograph images. In the line mode, achieved by switch 24, only the data base lines are shown in a ground range presentation.

Digital range desired, in this embodiment, is selected by closing one of switches 26 to 32. The numbers on the switches indicate multiples of the base range (1). The actual ranges simulated depend upon the particular radar or system which is being simulated.

Analog Range control knob 34 permits adjusting the computed image range between the digital ranges.

X control knob 36 and Y control knob 38 permit analog adjustment of the position of the CRT image. The analog controls are directly coupled to the video drive circuits and are used for final matching of the computed image on the CRT with the map image.

Map and CRT knobs, 40 and 42 respectively, control analog potentiometers that adjust the brightness of the map image and the computed image video intensity.

Joystick 16 is used as a control in five different modes. When A/C switch 44 is closed, joystick 16 operates as in an aircraft. Forward and backward motion controls elevation and right or left motion controls aircraft heading. Another potentiometer (not shown) is the throttle which flies the aircraft along the selected heading. Closing Data Base switch 46 causes movement of joystick 16 to move the data base in the X and Y directions. Memory cycle (Mem Cycle) switch 48 causes forward or backward motion of joystick 16 to count the memory address up or down, and with each address count the associated data base word is read out with the X and Y position of the word displayed on the computed image by the cursor. Cursor switch 50 when closed permits independent positioning of the cursor on the CRT by joystick 16. With elevation switch 52 closed, forward or backward movement of joystick 16 increases or decreases the elevation of a data base word.

Four modes are available for implementing a data base change. A particular mode is selected by closing the appropriate one of switches 54 to 60. In the New mode 54, the word is added to the last word in memory. In the Add mode 56, the word is inserted into the data base string following the current address word. In the Delete mode 58, the current address word is removed from the data base string. In the Change mode 60, the current address word is changed according to the control settings.

The Flags indicator includes six switches 62 to 72, each with an associated indicator lamp. The lamps below the switches indicate the "flag" or type of data base word of the current word. The switches will implement a new flag for the word. The flags are start point (SP) 62, delta line (ΔL) 64, hidden line (HL) 66, target (T) 68, line target (LT) 70, and dummy point (DP) 72.

The Code indicator 74 defines the reflectivity code to the right and left of a delta line, or the intensity and width of a target or line target. The lamps beside the switches define the current address word code. There are sixteen code levels — the first eight are implemented with switches 76 and 78 in the low position, the next eight with switches 76 and 78 in the high position.

Error lamp 80 lights whenever the Δx or Δy of a word exceeds eight bits. When the light is on, changes in the data base will not be implemented unless the Start Point flag switch is closed.

Initiate switch 82 implements the change or addition to the data base when closed.

Coordinate display 84 is a decimal display of the x, y, and z coordinates of the addressed word in the data base. When joystick 16 is in the Cursor or Elevation mode, the display reads out the x, y, and z of the changed or new word.

Finally, the data base word memory address is indicated by lamps 86.

A data base usually develops in three phases: first, a reflectivity data base is generated; second, elevation features are added; and finally, point and line targets are added to define cultural features. These phases may merge, and there are no firm rules controlling the sequence. Data base generation somewhat naturally follows this pattern.

When generating a reflectivity data base, large strings of data can be generated where the only variables are x and y. For an example, a coastline has a constant elevation and right/left reflectivities. This string of data is rapidly encoded using the x-y cursor to trace the shore line and the initiate button to enter the data. Precautions one must observe in encoding the reflectivity data are:

a. Δx and Δy values must not be exceeded. When this happens, an error light comes on, and data read in is disabled. Δx and Δy can only be exceeded by initiating a new start point.

b. Reflectivity lines must never cross. To go from one area to another and to cross data lines, a hidden line must be used.

c. Data lines must be separated by one resolution element — preferably two. Sharp points or spikes should be avoided.

d. The last point that encloses a bounded reflectivity area must have the same x and y values as the initial point. A one-resolution-element difference will cause a streak in the display.

e. Reflectivity lines must also have correct elevation.

A large part of the elevation data base is encoded where the reflectivity right and left are the same, and x, y, and z are the variables. In these cases, small line crossings are tolerable, and closing points or vertices do not have to match. Major ridge and valley lines are first encoded. Then, contour lines that define major features such as a cliff are encoded. The area is then cross-hatched with a few lines so that a complete elevation profile from any direction is defined. In cross-hatching, one must make sure that the elevation of the line end points match the terrain elevation and that the line does not cross a major feature line. For example, a line from one side of a ridge to the other side can wipe out the ridge line.

Point and line targets which are used to encode cultural features are encoded and implemented as a delta elevation above terrain. Critical point targets should not be placed on top of data lines. The processor will discard the target in preference to processing the data line. Larger areas defined by clusters of point targets can cover a line because beam and pulse width integration will merge the targets on the display so that those few deleted because of line conflict are not missed. Line targets can cross data lines and can cross on themselves. The line crossing point will be deleted by the processor, but this has negligible effect on the display.

The operational steps for generating a new data base are:

a. Load 16K on-line memory from tape with dummy points, and set range and elevation scales.

b. Mark map with start point and desired range scale.

c. Place map on light table screen 10 and set digital range 26–32 and analog range 34 scale by viewing the combined images (i.e., high-intensity CRT range with map range).

d. Select start point mode 62, new data mode 54, and cursor mode 50 for joystick.

e. Move cursor to start point, and press initiate button 82.

f. Select word flag (usually a delta line 64), reflectivity code 74, and move cursor to next point by viewing combined images.

g. If needed, select elevation mode 52 for cursor and set point elevation.

h. Press initiate button 82, and then repeat steps (f) and (g) for next point.

Any word in a data base can be changed by locating the word; selecting the change in x, y, z, or code; and pressing the initiate button when in the data base change mode. Words can be inserted into the data base string (the Add mode 56) or deleted from the data base (the Delta mode 58). In this operation, one must be careful that the Δx and Δy of the next word is not exceeded. If this happens, the error light flashes, and another way for deleting a feature, such as changing the words to hidden lines, must be used.

The operational steps for changing an existing data base are:

a. Read data base from tape 16K input memory.

b. Place map or photograph that defines the new data on light table screen 10.

c. Correlate computed image with map image by "flying" and scaling the computed image.

Place joystick in Memory Cycle mode 48, and cycle the cursor through the data base until point of change is located.

e. Select change, and initiate.

f. Compare change with desired map or photograph, and initiate further changes if needed.

The data base used is preferably in a compressed format where a contiguous string of lines defines areas of different radar reflectivity and terrain elevation features, i.e., ridge and valley lines. Further compression is achieved by using a delta format where the x and y position of the end of a line are defined relative to the preceding point or beginning of the line. The data base also includes point targets and line targets to define cultural features.

An example of the data base format and techniques for representing terrain and cultural features is given in FIG. 3. Lines 1' through 6' define a coastline where a water reflectivity is encoded on the right side of the lines (looking from the origin of the lines) and a land reflectivity is encoded on the left side of the lines. Lines 4', 5', 8', 9', and 10' define the reflectivity boundaries of a city. It will be noted that line 8' cannot be defined in terms of a $\Delta x$ and $\Delta y$ from line 6'. In this case a hidden line from 6' to 7' is used. Lines 11' through 24' define elevation features, with lines 11' and 12' being valley lines, and line 21' a ridge line.

Point targets are used to represent cultural features such as buildings, towers and ships. These are points 25' through 28'. Again a hidden line connects the point location to the previous location. Line targets are used to represent elongated cultural features. Line target 30' represents a ship's hull, with point target 28' defining the superstructure of the ship. Line targets are also used to define causeways, rows of buildings, and the cardinal effects of city streets. Combinations of targets and line targets are used to define complex cultural features.

A word in the data base may be encoded as follows:
$x$ - 8 Bits
$y$ - 8 Bits
$z$ - 8 Bits
Code Right - 4 Bits
Code Left - 4 Bits
Flags - 4 Bits Referring next to FIG. 4, the logic for data base generation, or change, is time shared with Image Generator 88. The entire data base memory 92 is cycled once, the partial computed image generated and displayed, and then for one sweep the interactive data base generator generates new data and inserts this into the data base memory. In the model system, the data base memory has 16,000 45 bit words and is read by the image generator at the rate of one word per microsecond. A sweep of the computed image is generated every millisecond. After 16 sweeps, the entire 16K memory has been cycled. During the next millisecond, the cursor is generated and displayed, and the data base changes are implemented. The coordinate transformations, translations and scaling between the $x'$ and $y'$ of the display and $x$ and $y$ of the data base are performed in this millisecond by the image generator.

Memory Timing and Control 90 is a standard, random access, read/write or read/modify/write memory interface with a memory cycle time of one microsecond. Memory Timing and Control 90 operates in two modes. In the memory cycle mode, two consecutive words at the generated address are read from Data Base Memory 92 and stored in Output Storage Register 94. In the data entry mode, the two words in Input Storage Register 96 are written into Data Base Memory 92 at the prescribed location. Two words are required because a change in $\Delta x$ or $\Delta y$ of a word must be compensated for in the next word. A single change would shift all words up the next start point. If the words are inserted into, or deleted from, a consecutive string of words, then a read/modify/write mode is implemented so that on the next memory cycle the memory is restacked in the new order. These operations are implemented by Data Mode Switches 54–60 when initiate switch 82 is pressed by the operator.

Figure 4:
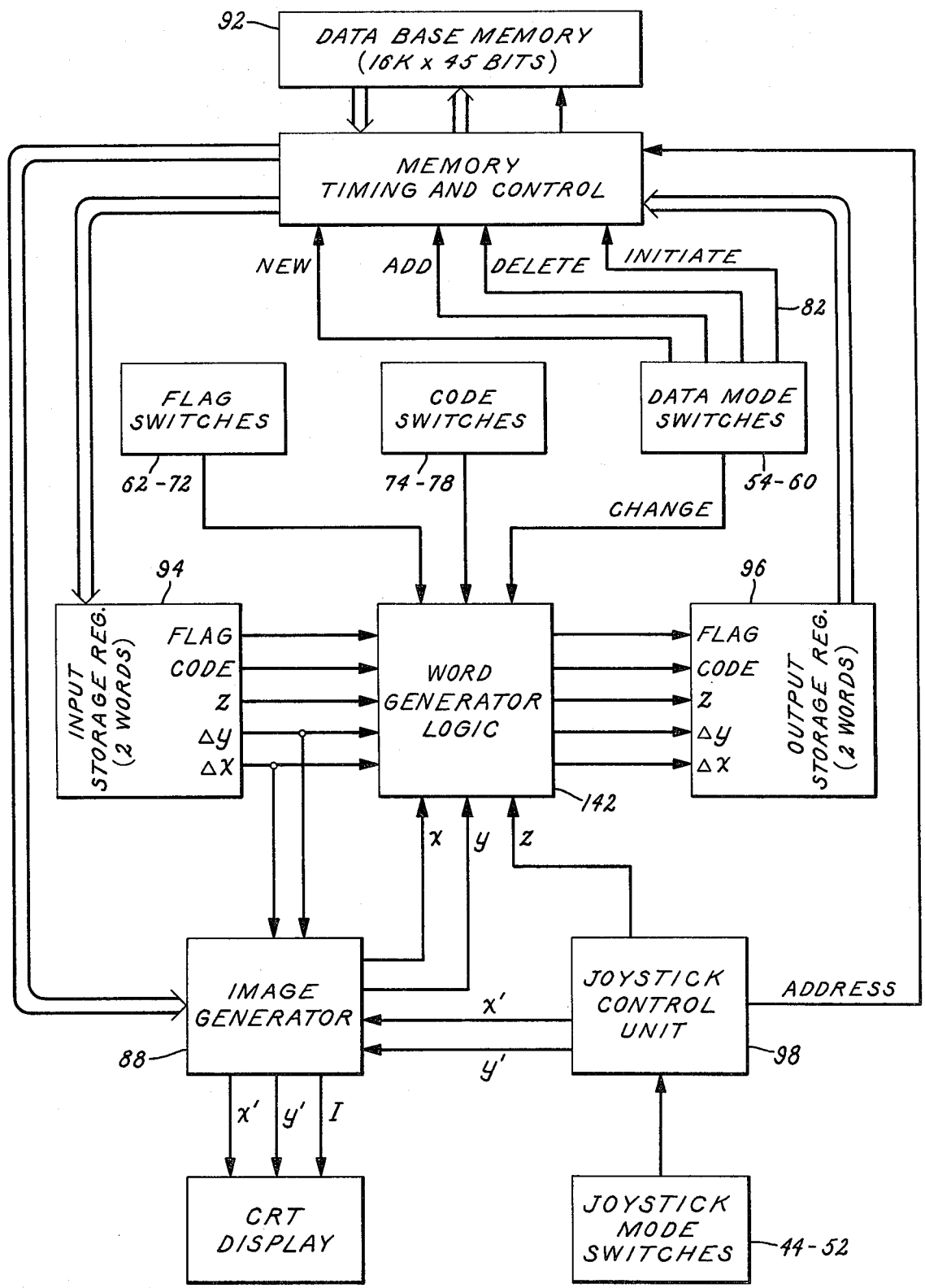
FIG. 4 is a block diagram of circuitry employed in the apparatus of this invention.
Figure 5:
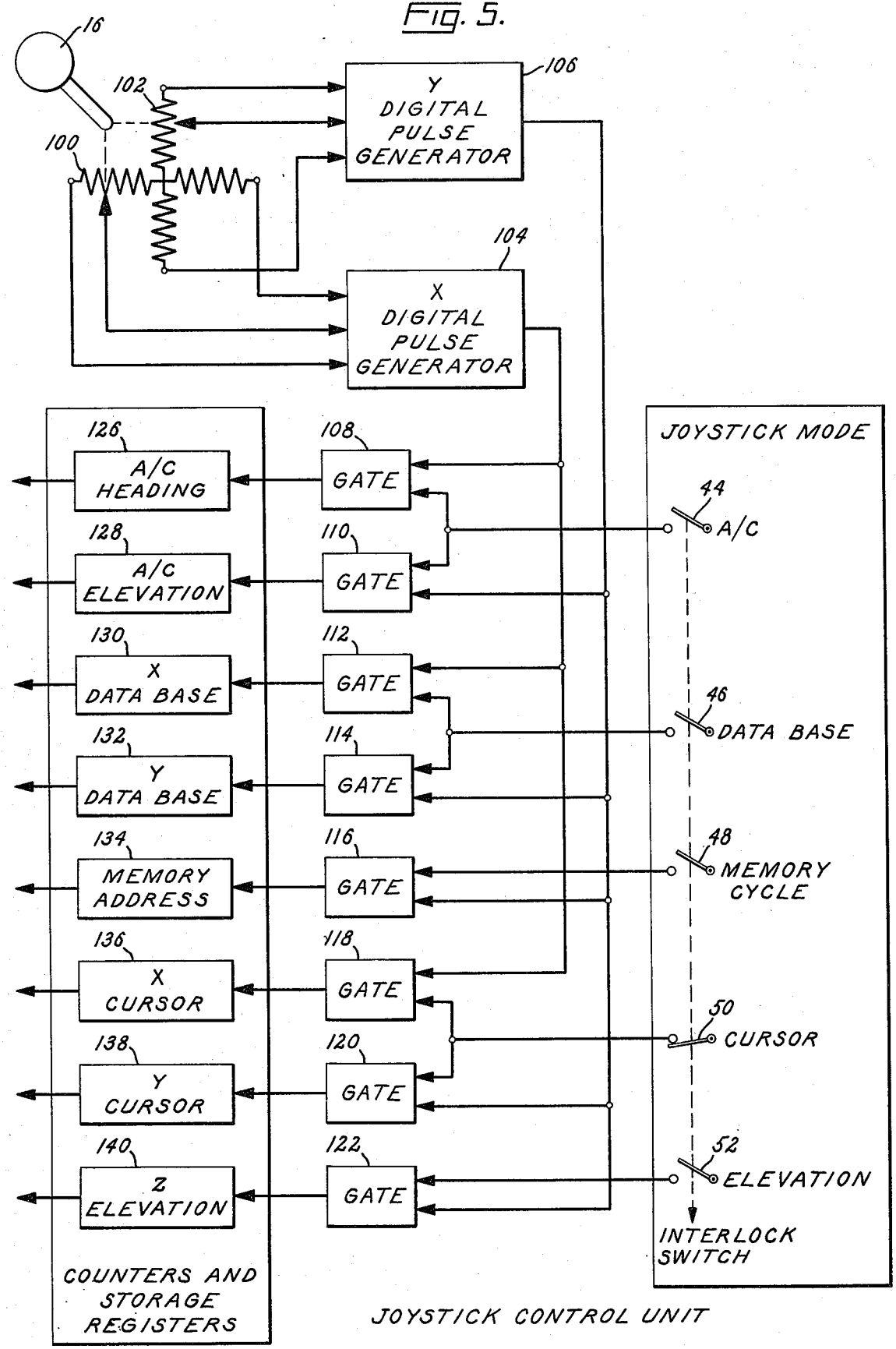
FIG. 5 is a block diagram of the Joystick Control Unit.

Joystick Control Unit 98 will now be described with reference to FIG. 5. Potentiometers 100 and 102 are feedback resistors of astable multivibrator oscillators 104 and 106 (here called X Digital Pulse Generator and Y Digital Pulse Generator) which generate a string of positive or negative pulses whose rates are a function of the potentiometer's resistance values. Joystick Mode switches 44–52 are interlocked so that only one switch will be closed at a time. The closed switch (in this case cursor 50) opens one or two mode digital gates 108–122 (in this case gates 118 and 120). Digital up and down counters and storage registers 126–140 count the pulses received from X Digital Pulse Generator 104 or Y Digital Pulse Generator 106 and continually store the result. As shown in FIG. 4, the stored values are input conditions for Image Generator 88, Word Generator Logic 142, or Memory Timing and Control 90.

Figure 6:
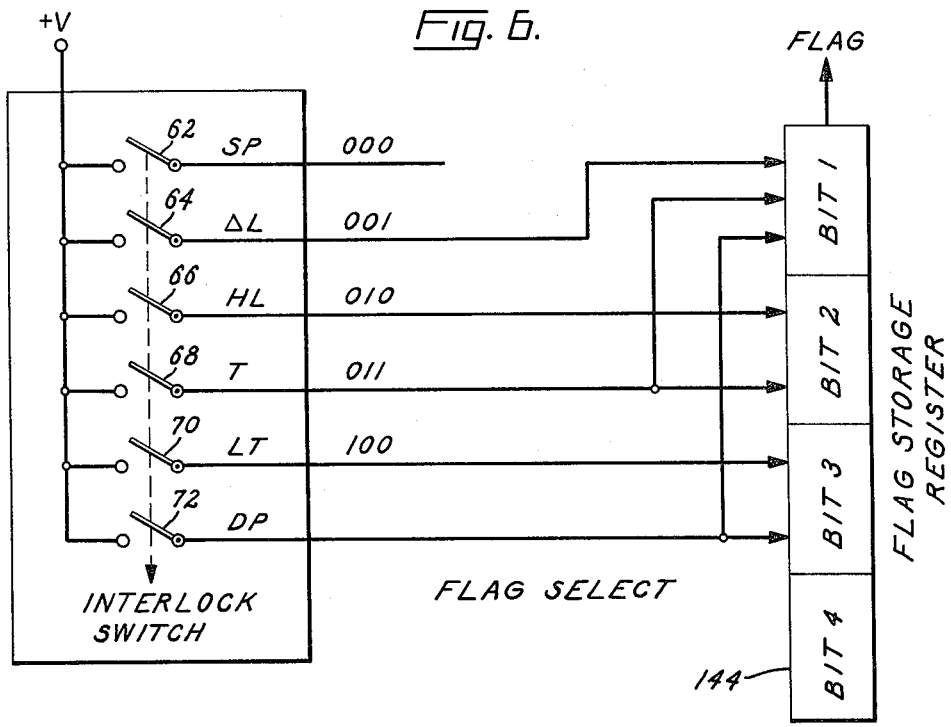
FIG. 6 is a block diagram of the Flag Select Unit.

Turning next to FIG. 6, Flag Select switches 62–72 are interlocked so that only one switch will be closed at a time. The four bit code is placed in register 144 (only three bits are actually needed for the six switches shown) and delivered to Word Generator Logic 142 (FIG. 4).

Figure 7:
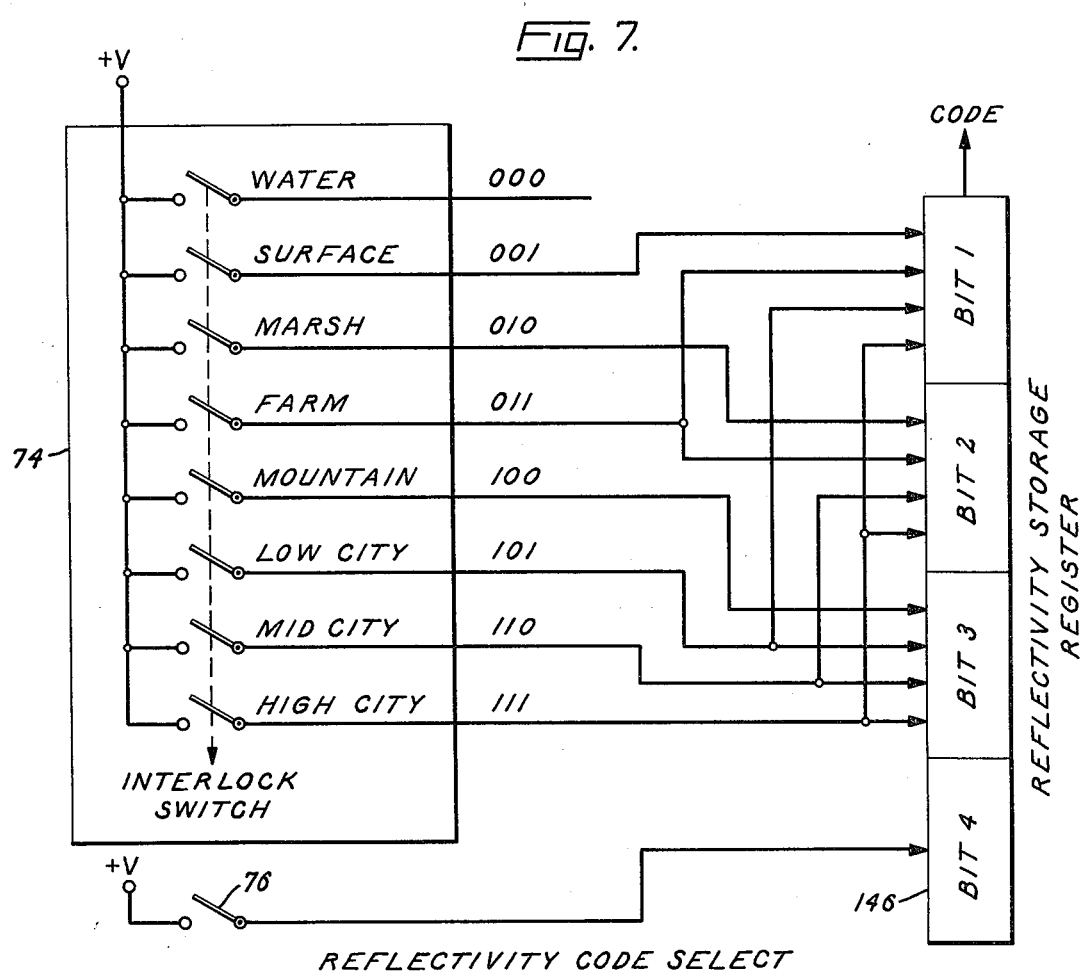
FIG. 7 is a block diagram of the Reflectivity Code Select Logic.

FIG. 7 shows the Reflectivity Code Switches 74 (both the left and right codes are similar). When switch 76 (also shown in FIG. 2) is open, closing one of switches 74 will put the indicated code into the register with Bit 4 being a zero. Closing switch 76 changes Bit 4 to a one. Thus providing a total of sixteen reflectivity codes.

Word Generator Logic 142 (FIG. 4) accepts and holds the inputs from the switch positions (Flag 62–72), (Code 74–78), Joystick Control Unit 98 ($z$ directly and $x$ and $y$ indirectly) and Input Storage Register 94 (the data base word from memory). It encodes these inputs into the new data base word and at the beginning of every Data Base Generation cycle, transfers the word to Output Storage Register 96.

The implementation of Word Generator Logic 142 will be explained first when Data Mode Switches 54–60 are in the New or Add position. In these modes Input Storage Register 94 is inhibited. The Flag switch positions are encoded into a data base word and held as shown in FIG. 6. The Code switch positions are implemented in the same manner in a separate storage register as shown in FIG. 7. The $z$ from Joystick Control Unit 98 is read into another register and held. The $x'$ and $y'$ generated by the Joystick Control Unit are in display coordinates. These are transformed to data base coordinates by Image Generator 88 and then transferred to Word Generator 142 where they are then converted to the delta format if the Word Flag is a delta line ($\Delta L$). If the word Flag is a start point, the 8 most significant bits of $x$ and $y$ are transferred as the first word and the 8 least significant bits are transferred as the second word to Output Storage Register 96.

When Data Mode Switches 54–60 are in the Change position, the Input Storage Word is read first into the storage registers of Word Generator 142. This word is then modified by the switch positions for a new $x$, $y$, or $z$. The implementation is straightforward except for changing $\Delta x$ or $\Delta y$. When a single $\Delta x$ or $\Delta y$ is changed, all words following are translated (because of the incremental nature of the data base) as shown in FIG. 8(a)

for a $\Delta y$ change. Thus when the $y$ component of point 1 is increased by $\Delta y$, the $y$ component of all subsequent points is also increased by $\Delta y$. To compensate for this shift, $\Delta y$ is substracted from the $y$ component of point 2 (and consequently all subsequent points).

The implementation for the change is shown in FIG. 8(c) where $\Delta y$ is added to $\Delta y_1$ by adder/subtractor 148, and subtracted from $\Delta y_2$ by subtractor/adder 150.

Image Generator 88 is a dedicated digital processor that converts the Data Base to a PPI map display. The processor uses standard digital arithmetic and logic modules that are paralleled and pipelined so that operations are stepped along at a one microsecond rate. The Data Base is read to the Image Generator at a word per microsecond rate and the output of the Image Generator is a 1,000 element video sweep per millisecond. With a 16K input memory, 16 sweeps of data are generated every memory cycle.

The first step in generating the display is to test each data base word to determine if it intersects a 16 sweep sector of the display. Those data words that are within the sector are stored in one of two 1,000 word buffer memories. One memory is receiving data for the current data base memory cycle, while the other memory which holds the sector generated from the previous data base memory cycle is being read out to the next processing stage. These memories are alternated every data base cycle. This procedure is often referred to as memory pingponging. This term will be used in the following descriptions.

Figure 9:
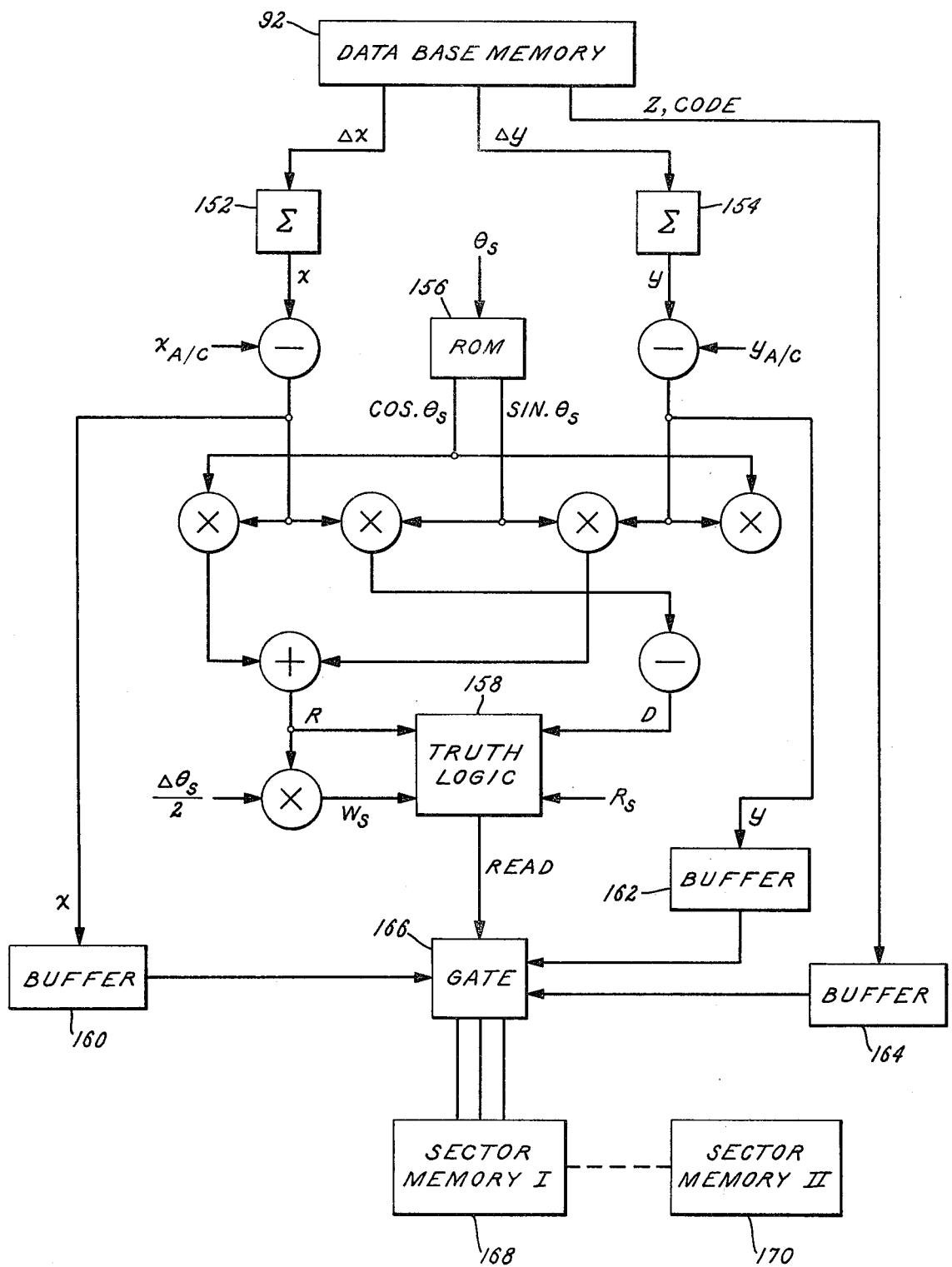
FIG. 9 is a block diagram of the sector stripping circuit.

The implementation of the sector data stripping operation is shown in FIG. 9. The $\Delta x$ and $\Delta y$ of the data base word are continuously summed by summers 152 and 154 respectively, to generate whole values. The whole values are translated to display coordinates where $X_{A/C}$ and $Y_{A/C}$ is the center of the display relative to data base coordinates. The translated $x$ and $y$ are then rotated to the selected sweep sector azimuth, $\theta_s$, by the equations $$R = (X_{A/C} - X) \cos \theta_s + (Y_{A/C} - Y) \sin \theta_s$$
$$D = (X_{A/C} - X) \sin \theta_s - (Y_{A/C} - Y) \cos \theta_s$$

Cos $\theta_s$ and sin $\theta_s$ are determined from read only memory (ROM) 156. The multiples are implemented in parallel at rate of a word per microsecond.

D is the distance of a point from the sweep ($\theta_s$) and R is the distance along the sweep to the distance vector D. The width of the sweep ($W_S$) at a distance (R) is:

$$W_S = \pm (\Delta \theta_s/2) R$$

where $\Delta \theta_s$ is the sector angle which equals 16 sweeps.

Given $D$, $R$, $W_S$ and $R_S$ (the radius of the sector), a line, or point, that intersects the sector is determined by simple digital Truth Logic 158. A point is within the sector if either $R$ is positive and either is less than $R_S$, and $D$ is less than $W_S$. A data base line intersects the sector if either end point is within the sector or if the $D$'s of the end points are of opposite sign and $R$ is positive and less than $R_S$.

As shown in FIG. 9, the $x$, $y$, $z$ and Code of the data base word are delivered to buffers 160, 162 and 164 respectively, to put them in step with the output of Truth Logic 158. If the Truth Logic determines that a word is within a sector, gate 166 is enabled and the word is read into Sector Memory 1 168. Sector Memory 11 170 contains the sector data base generated during the previous memory cycle. This date base is read out at a word per microsecond rate and the data is tested to determine if it intersects the display sweep line. The implementation and tests are the same as used in the sector strip operation.

The coordinate transformations performed at this stage of the processing are time shared with the Data Base Generation mode. In the one millisecond cursor and data base generation cycle, the $x$ and $y$ of the cursor and the sine and cosine of the display azimuth are entered. The D and R outputs are then the $x$ and $y$ of the cursor in data base coordinates (see FIG. 4).

When a line intersects a sweep, the ground range ($R_g$) and the elevation ($Z$) of the intersection point are determined by solving the equations:

$$R_g = R_1 + (d_1/d_1 + d_2)(R_1 - R_2)$$
$$Z = Z_1 + (d_1/d_1 + d_2)(Z_1 - Z_2)$$

These equations are implemented in one microsecond by a clipping divide technique that is described in U.S. Pat. No. 3,769,442.

The data base has been encoded as a contiguous string of lines with the reflectivity to the right and to the left encoded with each word. The sign of D now defines the reflectivity code to be implemented. A positive D selects the right hand code; a negative selects the left.

Figure 10:
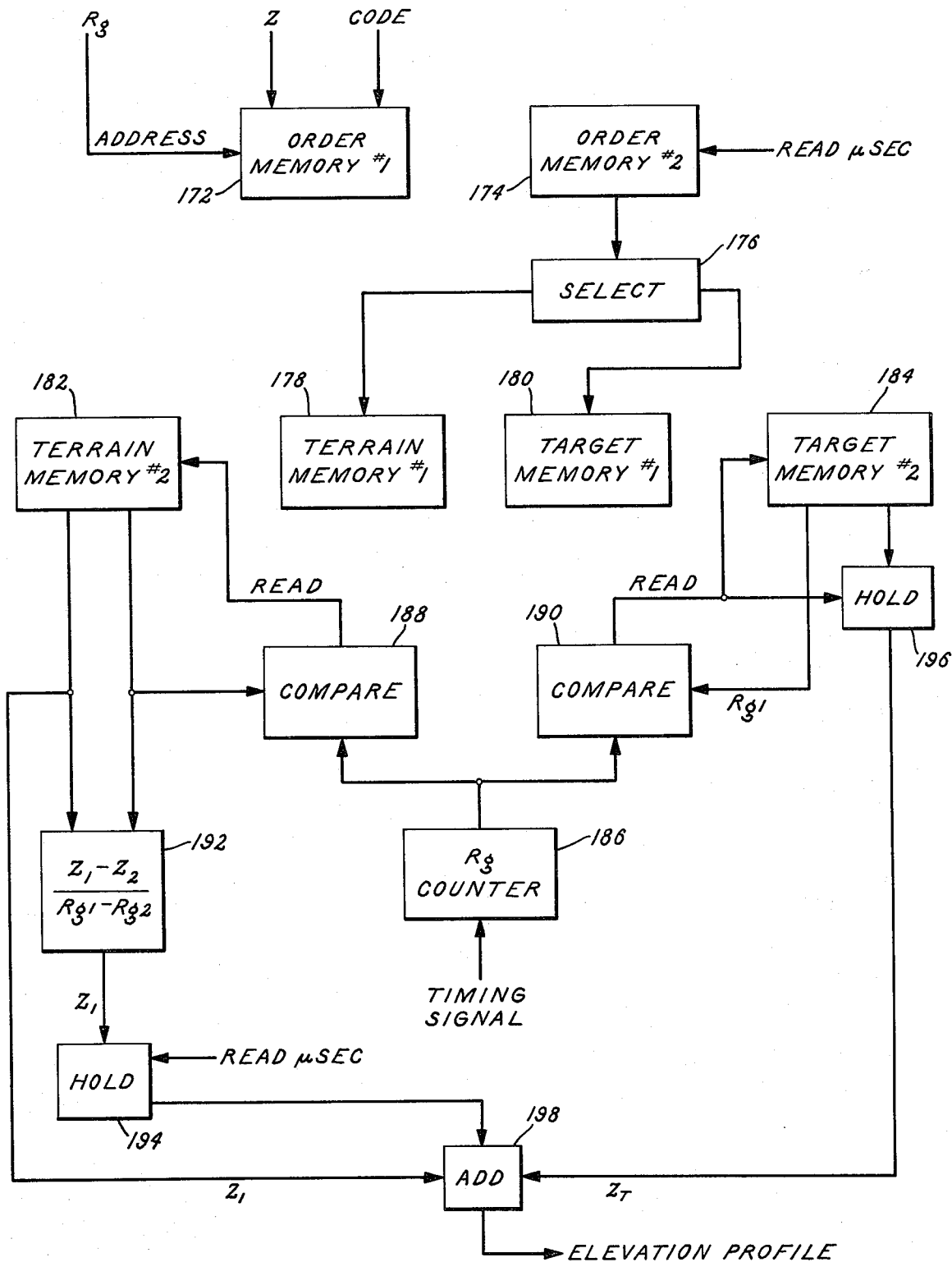
FIG. 10 is a block diagram of the circuits for producing the elevation profile.

The intersection elevation, the selected reflectivity code and flags are buffered so that they are in-step with the computed range and then are read into ping-pong 1,000 word Order Memories 172 and 174 using ground range as the address as shown in FIG. 10. The other Order memory which contains the previous sweep data in ground range order is read out at a count per microsecond into Selector 176 where the target data is separated from the elevation/boundary line data by recognizing the word flags. The data is then read into separate buffer memories 178 and 180.

While data is being read out memories 178 and 180, previously generated data is being read out of memories 182 and 184. The 1,000 element, one millisecond sweep profile is generated on read-out of Terrain and Target memories 182 and 184. On the first $R_g$ count from $R_g$ counter 186, $Z_1$ and $R_{g1}$ are read out. $Z_1$ is assumed to be the first elevation element. $R_{g1}$ for both target and terrain are compared to the $R_g$ count in compare units 188 and 190. When the $R_g$ count and $R_{g1}$ of the terrain are equal, the second stored terrain point is read out, the incremental elevation ($Z_i$) is determined and added to $Z_1$ at every range count.

$$Z_i = (Z_1 - Z_2/R_{g1} - R_{g2})$$

$Z_i$ is computed in unit 192 and delivered to Hold register 194. When a compare is made in compare unit 190 with the target memory, the elevation of the target in hold register 196 (which is encoded as a height above terrain) is added in Add unit 198 to the terrain elevation element. These steps are repeated and the elevation profile is generated at an element per microsecond. At the same time and in step with the elevation profile a reflectivity profile is generated.

In the generation of the PPI ground map display, the CRT sweep drives are generated by $$X = R_g \cos \theta$$
$$Y = R_g \sin \theta$$

The CRT intensity is the reflectivity profile. The analog sweep drives and video intensity are generated by standard digital to analog convertors. The resulting display will be a true map image of the data base.

The elevation profile can be converted to a video intensity and if the conversion is quantized, the shades of grey steps can be correlated directly with the contour lines of a map image.

The foregoing describes the generation of the Map 22 (FIG. 2) display. The Line 24 display is generated by initiating an intensity impulse every time a comparison is made with the $R_g$ Counter. These images are sufficient for interactive data base generation. However, for prediction of a realistic Radar 20 image further processing is required. All the information required is contained in the sweep reflectivity and elevation profiles. This further processing is implemented at a element per microsecond with standard digital arithmetic and logic modules that are paralleled and pipelined as needed.

Inputs for the radar image generation are;

$h_{A/C}$ = elevation of the aircraft
$Z$ = element elevation
$I$ = element reflectivity or intensity
$R_g$ = the element ground range.

The view angle, $\phi$, between the aircraft horizontal and ground range elements is:

$$\phi = \text{Tan}^{-1} (h_{A/C} - Z/R_g)$$

The terrain slope angle, $\beta$, is:

$$\beta = \text{Tan}^{-1} (\Delta Z/\Delta R_g),$$

where $\Delta Z$ is the change in elevation between ground range elements and $\Delta R_g$ is the ground range increment. The radar slant range, $R_s$, to an element is $$R_s = R_g \cos\phi + (h - Z) \sin \phi$$

The values of $R_s$, $\phi$, and $\beta$ are computed for each ground range count by standard digital arithmetic and logic modules that are paralleled and pipelined.

The intensity of a radar return is a function of the angle between the terrain slope and the view angle. This is simulated by modulating the element reflectivity code by the square root of $\cos (\phi - \beta)$.

Radar shadow effects are determined by comparing $\phi$ as the ground range count progresses. If $\phi$ decreases from the previous element, then the element is in shadow and all following elements are in shadow until $\phi$ increases over the value at the beginning of shadow. When an element is in shadow the video intensity is reduced to zero.

The slant range presentation of a radar display and the effects of beam width integration are simulated by driving the sweeps by $$X = (R_s - Z_o) \cos (\theta \mp \Delta\theta_{BW})$$
$$Y = (R_s - Z_o) \sin (\theta \mp \Delta\theta_{BW})$$

where
$R_s$ = the element slant range
$Z_o$ = the altitude of the aircraft above terrain
$\Delta\theta_{BW}$ = ½ the beam width An unusual advantage of this approach is that the CRT phosphor provides the integration effects of radar beam width and slant range return.

The image from a radar return is not smooth. It is a textured return broken up by terrain variations, small buildings and other minor features that are not encoded in the data base. The texturing of the image is simulated by modulating the reflectivity code with a pseudo random code.

With these effects implemented a realistic radar image is generated. However, there are still many other radar effects which can be implemented. These are somewhat a function of the application of the device and the parameters of the particular radar. These include antenna power pattern, pulse width integration, horizontal incident angle, receiver gain, etc. These effects can also be readily implemented by standard digital arithmetic and logic modules.

As previously mentioned, the apparatus described is an example of a digital data base generator where the data base is that of a digital radar land mass simulator, for other purposes such as digital map making, modifications and simplifications can be made.

I claim:

1. A digital data base generator comprising:
   memory means for storing in digital form a data base descriptive of a selected land mass;
   display means for displaying a selected portion of the data base in graphic form;
   comparison means for comparing the displayed selected portion of the data base with a graphic depiction of land mass information from another source related to said selected portion of the data base; and
   control means for modifying said data base.

2. A digital data base generator in accordance with claim 1 wherein:
   said comparison means includes a 45° beam splitter so that the image of the display and the image of the graphic depiction of land mass information from said other source can be placed in overlying relationship.

3. A digital data base generator in accordance with claim 1 wherein:
   said control means includes a control for moving a cursor to a desired location on said display means.

4. A digital data base generator comprising:
   memory means for storing in digital form information describing land mass points in the data base;
   means for displaying a selected portion of the data base in graphic form;
   means for simultaneously displaying, in an overlying fashion, a graphic depiction of land mass information from another source relating to said selected portion of the data base; and
   control means for modifying said data base.

* * * * *